United States Patent
Koith

(10) Patent No.: US 9,539,964 B2
(45) Date of Patent: Jan. 10, 2017

(54) EARTHING ELEMENT

(71) Applicant: Kautex Textron GmbH & Co. KG, Bonn (DE)

(72) Inventor: Jörg Koith, Neunkirchen-Sellscheid (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 32 days.

(21) Appl. No.: 14/078,998

(22) Filed: Nov. 13, 2013

(65) Prior Publication Data

US 2014/0139967 A1  May 22, 2014

(30) Foreign Application Priority Data

Nov. 13, 2012 (DE) .................. 10 2012 022 129

(51) Int. Cl.
*B60R 16/06* (2006.01)
*H05F 3/02* (2006.01)

(52) U.S. Cl.
CPC .............. *B60R 16/06* (2013.01); *H05F 3/02* (2013.01)

(58) Field of Classification Search
CPC ................................. H05F 3/02; B60R 16/06
USPC ........................................... 361/216
See application file for complete search history.

(56) References Cited

U.S. PATENT DOCUMENTS

| | | | | |
|---|---|---|---|---|
| 4,698,724 A | * | 10/1987 | Burvee | 361/220 |
| 5,219,492 A | * | 6/1993 | Osterholm | C08G 61/126 |
| | | | | 252/500 |
| 6,283,320 B1 | * | 9/2001 | Patch | 220/88.1 |
| 6,426,859 B1 | * | 7/2002 | Cohen | A61N 1/14 |
| | | | | 361/212 |
| 6,446,826 B1 | * | 9/2002 | Foltz et al. | 220/86.2 |
| 8,817,448 B1 | * | 8/2014 | Maurer | 361/215 |
| 2002/0009909 A1 | | 1/2002 | Kondoh | |
| 2003/0098307 A1 | | 5/2003 | Hagano et al. | |
| 2003/0173550 A1 | * | 9/2003 | Fox et al. | 252/500 |
| 2005/0146833 A1 | * | 7/2005 | Beamer et al. | 361/212 |
| 2010/0282757 A1 | | 11/2010 | Walkowski et al. | |
| 2012/0206852 A1 | * | 8/2012 | Fitz | B60R 16/06 |
| | | | | 361/216 |
| 2015/0175402 A1 | | 6/2015 | Schutz | |

FOREIGN PATENT DOCUMENTS

| | | |
|---|---|---|
| DE | 4344273 A1 | 6/1995 |
| DE | 19932383 A1 | 1/2001 |
| EP | 1632379 A1 | 3/2006 |
| WO | 2007042536 A1 | 4/2007 |
| WO | 2008121605 A2 | 10/2008 |

* cited by examiner

*Primary Examiner* — Scott Bauer
(74) *Attorney, Agent, or Firm* — Grossman Tucker Perreault & Pfleger, PLLC

(57) ABSTRACT

The invention relates to an earthing element for the filler pipe of a motor vehicle, and also to a mouthpiece on a filler pipe of a motor vehicle. The earthing element is in the form of an earthing strap (7) which is composed of an electrically conductive polymer.

12 Claims, 2 Drawing Sheets

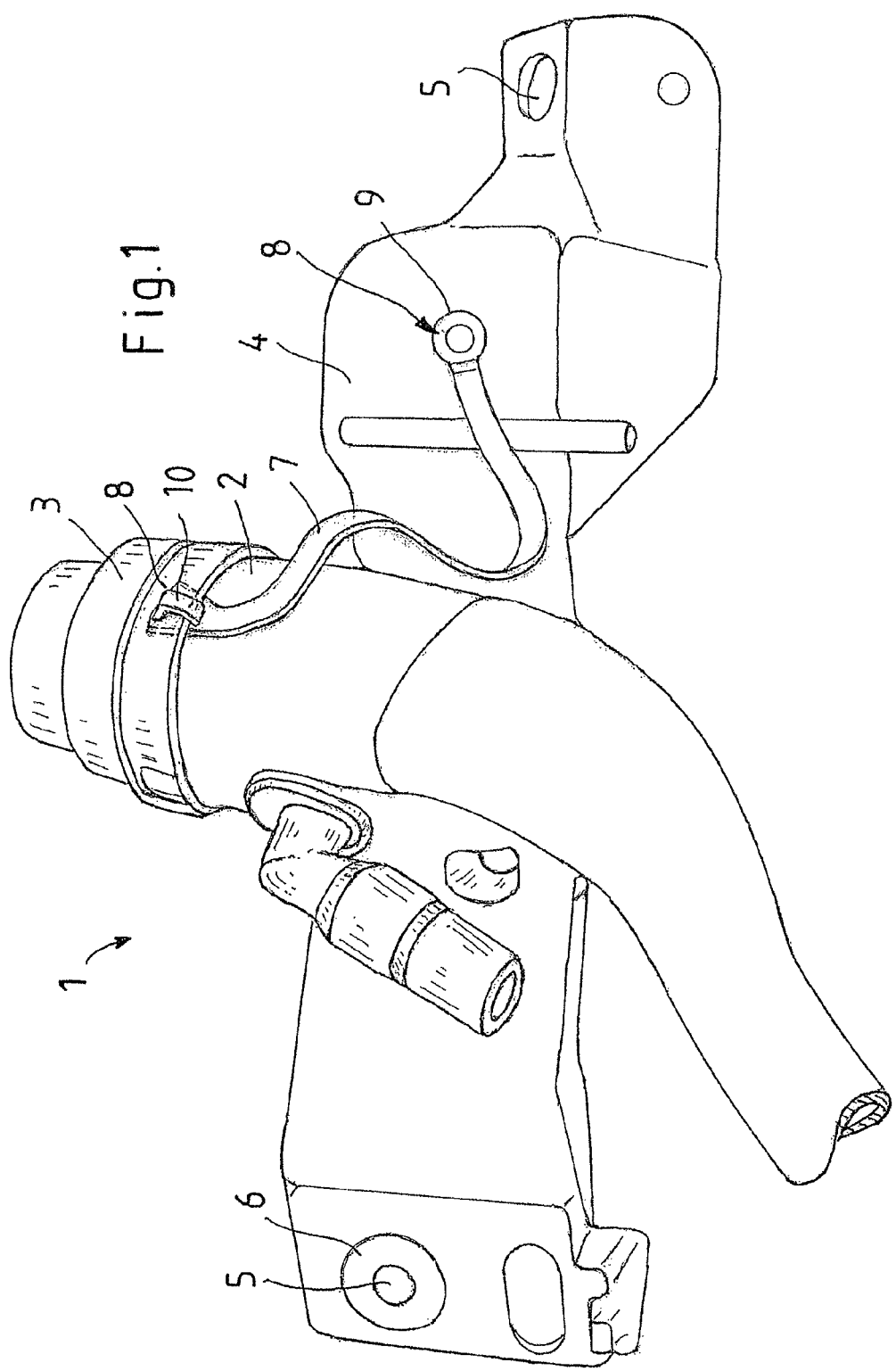

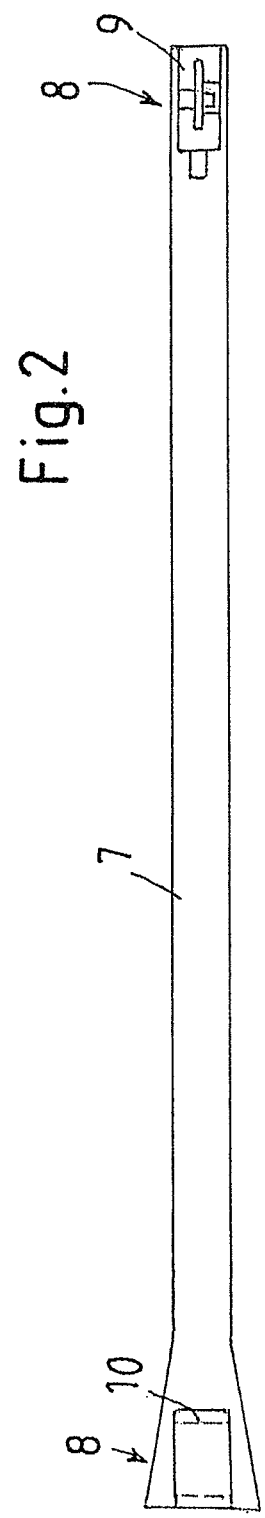
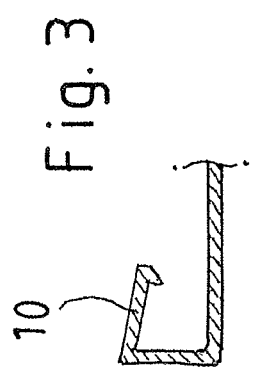

EARTHING ELEMENT

The invention relates to an earthing element for conductively connecting metallic components to an earth.

The invention also relates to an electrically conductive mouthpiece on a filler pipe of a motor vehicle having at least one earthing element for establishing an electrically conductive connection to an earth.

An earthing element and a filler neck for a fuel container having a mouthpiece of this kind are known, for example, from DE 43 44 273 A1.

Filler necks for fuel containers are often provided with mouthpieces which form a depth stop for a fuel pump nozzle which is to be inserted into the filler neck. Furthermore, mouthpieces of this kind are designed such that incorrect filling of the vehicle tank can be prevented. They are used firstly to guide the fuel pump nozzle, and secondly flap devices, for example in the form of a so-called lead-free flap, and means for earthing the filler pipe are usually provided on mouthpieces of this kind. Said means for earthing the filler pipe are required in order to reliably dissipate the electrostatic charging of the filler pipe which is produced, for example, by the liquid flowing in.

Mouthpieces in the form of metallic sleeves, to which an earthing cable, an earthing arm or an earthing strap is connected, these being electrically conductively connected to the earth of the vehicle, are often provided on thermoplastic fuel containers with thermoplastic filler pipes and filler necks.

An earthing strap of this kind is also described, for example, in the abovementioned document DE 43 44 273 A1. EP 1 632 379 also mentions measures for earthing a filler pipe for a fuel tank.

The earthing cables used are, for example, plastic-encapsulated copper wires which are provided with clamped-on contact shoes. These are difficult to mount and relatively expensive and primarily have the disadvantage that contact corrosion occurs in the region of connection of the contact shoes, as a result of which the conductivity is reduced over time and the effectiveness of the earthing may be adversely affected.

The invention is based on the object of providing an earthing element of the kind cited in the introductory part with which said disadvantages can be avoided.

The invention is also based on the object of providing a mouthpiece on a filler pipe of a motor vehicle having at least one earthing element which is improved in said respect.

The object is achieved initially by an earthing element for conductively connecting electrically conductive components to an earth, said earthing element being distinguished in that the earthing element is composed of an electrically conductive polymer.

An earthing element of this kind can advantageously be in the form of a strap with fastening means integrally formed on its end, wherein the problem of contact corrosion is completely eliminated in this way. The earthing element has the advantage that the fastening means can be integrally formed on the strap, with the result that they are ultimately captive and no contact corrosion occurs in the region of connection of the earthing element.

An earthing element of this kind can be produced in a comparatively simple and cost-effective manner by injection moulding.

The fastening means selected can be, for example, one or more elements from a group comprising hooks, fastening rings, flat plugs, pin plugs, round plugs, fastening forks, fastening clips and the like. All of these fastening elements can be integrally formed in an extremely simple manner.

The ends of the earthing strap are preferably provided with fastening means of this kind, for example hooks, clips or rings, which withstand increased pull-off forces, this being due to a comparatively lower modulus of elasticity of the plastic compared to copper cables.

The earthing element can, for example, be in the form of an injection-moulded strap with a thermoplastic matrix and conductive particles embedded in the matrix.

In an expedient refinement of the earthing element, it can be composed, for example, of a carbon-black-filled polyamide, wherein the conductivity is created by the filler. The filler provided does not necessarily have to be carbon black, but rather other conductive particles such as metal particles, for example, can also be considered as fillers.

By way of example, the earthing element can be in the form of a flat cable with an integrally formed tooth system. To this end, the earthing strap can be provided at one end with a plastic locking tongue which is arranged in a bushing and into which an end of the earthing strap which is provided with a tooth system can be inserted.

As an alternative, the earthing strap can be in the form of a round cord.

The object on which the invention is based is further achieved by an electrically conductive mouthpiece on a filler pipe of a motor vehicle having at least one earthing element for electrically conductively connecting the mouthpiece to an earth of the motor vehicle, wherein the earthing element is composed of an electrically conductive polymer.

The earthing element can be provided, for example, as a strap, flat cable or round cord which is composed of thermoplastic and has fastening means formed on its end. The earthing element was preferably produced by injection moulding. Preferred fastening means are those fastening means with which the earthing element can be connected in an interlocking manner, this in particular providing for the comparatively low modulus of elasticity of the plastic. In order to withstand an increased pull-off force, the fastening means can also be in the form of metallic fastening means which are encapsulated by the plastic of the earthing element. By way of example, the fastening means provided can be encapsulated lugs or the like which have been encapsulated as insert parts in the mould during the production of the earthing element.

The invention will be explained below with reference to an exemplary embodiment which is illustrated in the drawings.

In the drawings:

FIG. 1: shows a perspective illustration of a filler pipe of a fuel container for a motor vehicle in the installed position, FIG. 2: shows an illustration of the earthing element, and FIG. 3: shows an enlarged view of one end of the earthing element.

FIG. 1 shows the filler head 1 of a filler pipe for a thermoplastic fuel container. The filler head 1 comprises a filler neck 2 and a mouthpiece 3.

The filler head 1 and the filler neck 2 and the fuel container (not illustrated) for a motor vehicle are formed from thermoplastic. The mouthpiece 3 is composed of metal and, in a known manner, is in the form of a filling aid for a fuel pump nozzle with a depth stop for the fuel pump nozzle and a valve flap which is arranged in the interior of the filler neck 2.

The filler head 1 is welded to a thermoplastic fastening bracket 4 which is provided with fastening holes 5 for connection to the body of a motor vehicle. Metallic fastening bushes 6 are inserted into each of the fastening holes 5, fastening means, for example in the form of screws or stud bolts, being passed through said fastening bushes in the installation position.

The mouthpiece 3 is connected to the fastening bracket in the region of a fastening hole by means of an earthing strap 7 such that a connection end 8 of the earthing strap is in electrically conductive contact with the metallic fastening bush 6. By virtue of being fastened to the body of the motor vehicle, the earthing strap 7 is connected to earth in this way. A connection end 8 of the earthing strap is in the form of an integrally formed fastening eye 9. Said fastening eye is secured to the body of the motor vehicle, for example, by a fastening means in the form of a stud bolt which passes through the fastening bracket 4.

As an alternative, a connection end 8 of the earthing strap 7 can be in the form of a plug receptacle which can be pushed onto a fastening tongue, which is provided on the mouthpiece 3, under prestress, with the result that said fastening tongue is adequately secured against working loose. The opposite connection end does not necessarily have to be in the form of an eye, but rather can also be in the form of a hook which surrounds the fastening bush 6 in the installation position and is secured by the fastening means which passes through the fastening bush 6. Conductive contact is made with the earthing strap 7 by means of the fastening bush 6 and the fastening means which passes through said fastening bush and, for example, is in the form of a stud bolt.

The hook 10 is illustrated by way of example in FIG. 3. The connection end 8 of the earthing strap 7 which is remote from the hook 10 can have a plug receptacle in the form of a slot into which the fastening tongue 9 can be inserted under prestress, with the result that the plug connection is adequately secured against working loose.

The earthing strap 7 is preferably composed of a carbon-black-filled polyamide and was obtained by injection moulding.

LIST OF REFERENCE SYMBOLS

1 Filler head
2 Filler neck
3 Mouthpiece
4 Fastening bracket
5 Fastening holes
6 Fastening bushes
7 Earthing lug
8 Connection end
9 Fastening eye
10 Hook

What is claimed is:

1. An electrically conductive mouthpiece on a filler pipe of a motor vehicle having at least one earthing element to electrically conductively connect the mouthpiece to an earth of the motor vehicle,
wherein the earthing element is in a form of a strap, and is formed of an electrically conductive plastic comprising at least one polymer,
wherein the strap includes fastening means formed at at least one end of the strap, and
wherein the fastening means includes metallic fastening means encapsulated by the electrically conductive plastic and suitable for connection to a body of the motor vehicle.

2. The electrically conductive mouthpiece according to claim 1, wherein the strap comprises a flat cable or round cord.

3. The electrically conductive mouthpiece according to claim 1, wherein the electrically conductive plastic encapsulating the metallic fastening means is integrally formed as a single piece with a remainder of the strap.

4. The electrically conductive mouthpiece according to claim 1, wherein the metallic fastening means includes as least one moulded-in insert encapsulated in the electrically conductive plastic.

5. The electrically conductive mouthpiece according to claim 1, wherein the fastening means comprises at least one of a hook, a fastening ring, a plug, a fastening fork and a fastening clip.

6. The electrically conductive mouthpiece according to claim 1, wherein the electrically conductive plastic is a thermoplastic matrix with electrically conductive particles embedded in the thermoplastic matrix.

7. The electrically conductive mouthpiece according to claim 6, wherein the thermoplastic matrix is a polyamide.

8. The electrically conductive mouthpiece according to claim 6, wherein the electrically conductive particles comprise at least one of metal particles and carbon-black particles.

9. The electrically conductive mouthpiece according to claim 1, wherein the strap is an injection-moulded plastic strap.

10. The electrically conductive mouthpiece according to claim 9, wherein the electrically conductive plastic encapsulating the metallic fastening means is integrally formed as a single piece with a remainder of the strap.

11. The electrically conductive mouthpiece according to claim 9, wherein the metallic fastening means includes as least one moulded-in insert encapsulated in the electrically conductive plastic.

12. The electrically conductive mouthpiece according to claim 1, wherein the strap is injection moulded and includes fastening means formed at two ends of the strap, wherein both fastening means at each end of the two ends of the strap comprise the electrically conductive plastic formed as a single piece with a remainder of the strap, and wherein the fastening means at one end of the two ends of the strap includes the metallic fastening means encapsulated by the electrically conductive plastic.

* * * * *

UNITED STATES PATENT AND TRADEMARK OFFICE
CERTIFICATE OF CORRECTION

| | | |
|---|---|---|
| PATENT NO. | : 9,539,964 B2 | Page 1 of 1 |
| APPLICATION NO. | : 14/078998 | |
| DATED | : January 10, 2017 | |
| INVENTOR(S) | : Koith | |

It is certified that error appears in the above-identified patent and that said Letters Patent is hereby corrected as shown below:

On the Title Page

Inventor item (72), in Column 1, delete "Neunkirchen-Sellscheid" and insert
-- Neunkirchen-Seelscheid --, therefor.

In the Claims

In Column 4, Line 18, in Claim 4, delete "as" and insert -- at --, therefor.

In Column 4, Line 43, in Claim 11, delete "as" and insert -- at --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*